W. W. BEARDSLEY.
FERTILIZER DISTRIBUTER.
APPLICATION FILED JAN. 23, 1911.
993,815.
Patented May 30, 1911.
2 SHEETS—SHEET 2.
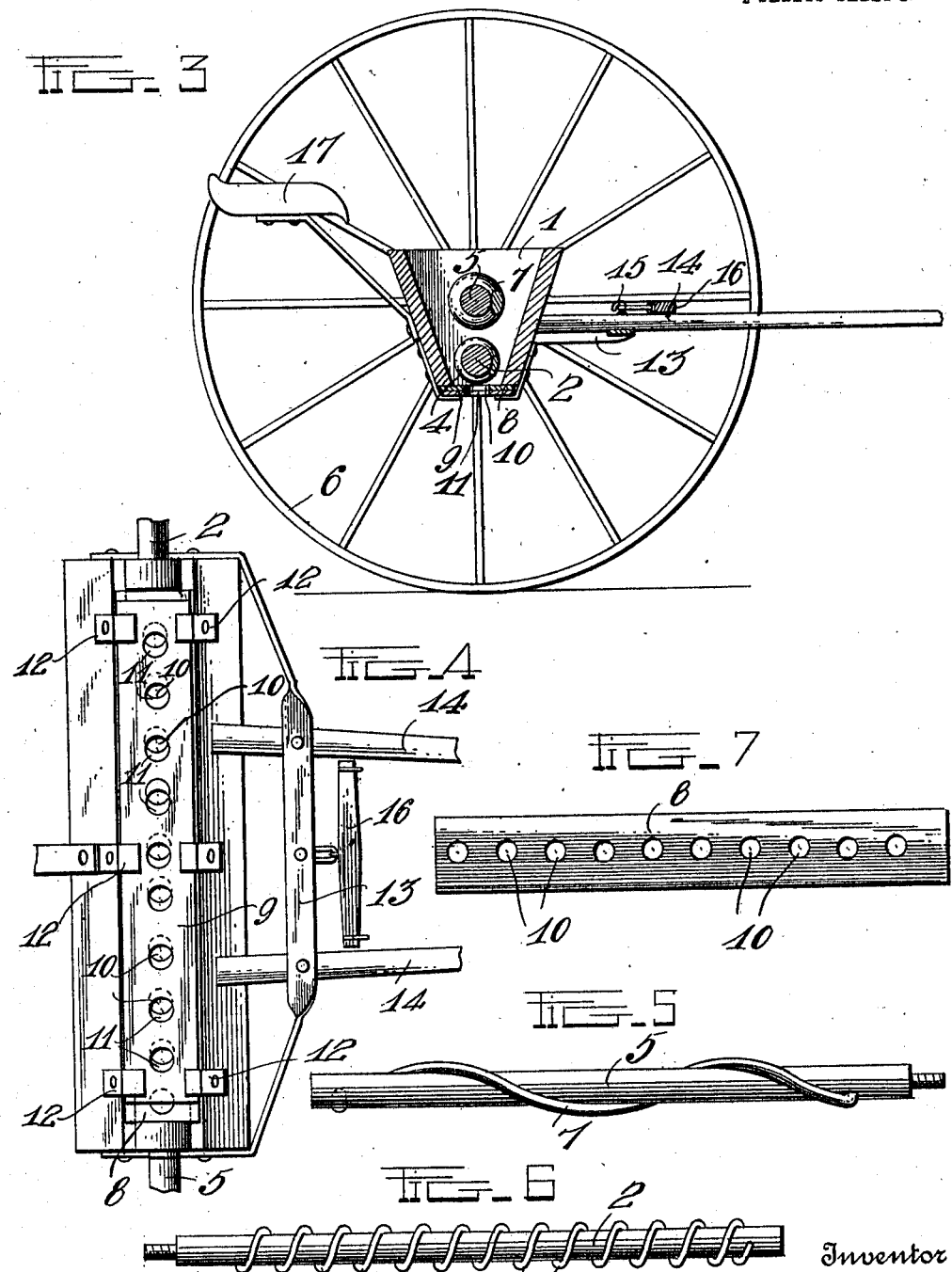
Witnesses
C. R. Hardy
O. B. Hopkins
Inventor
W. W. Beardsley
by H. B. Willson & Co.
Attorneys

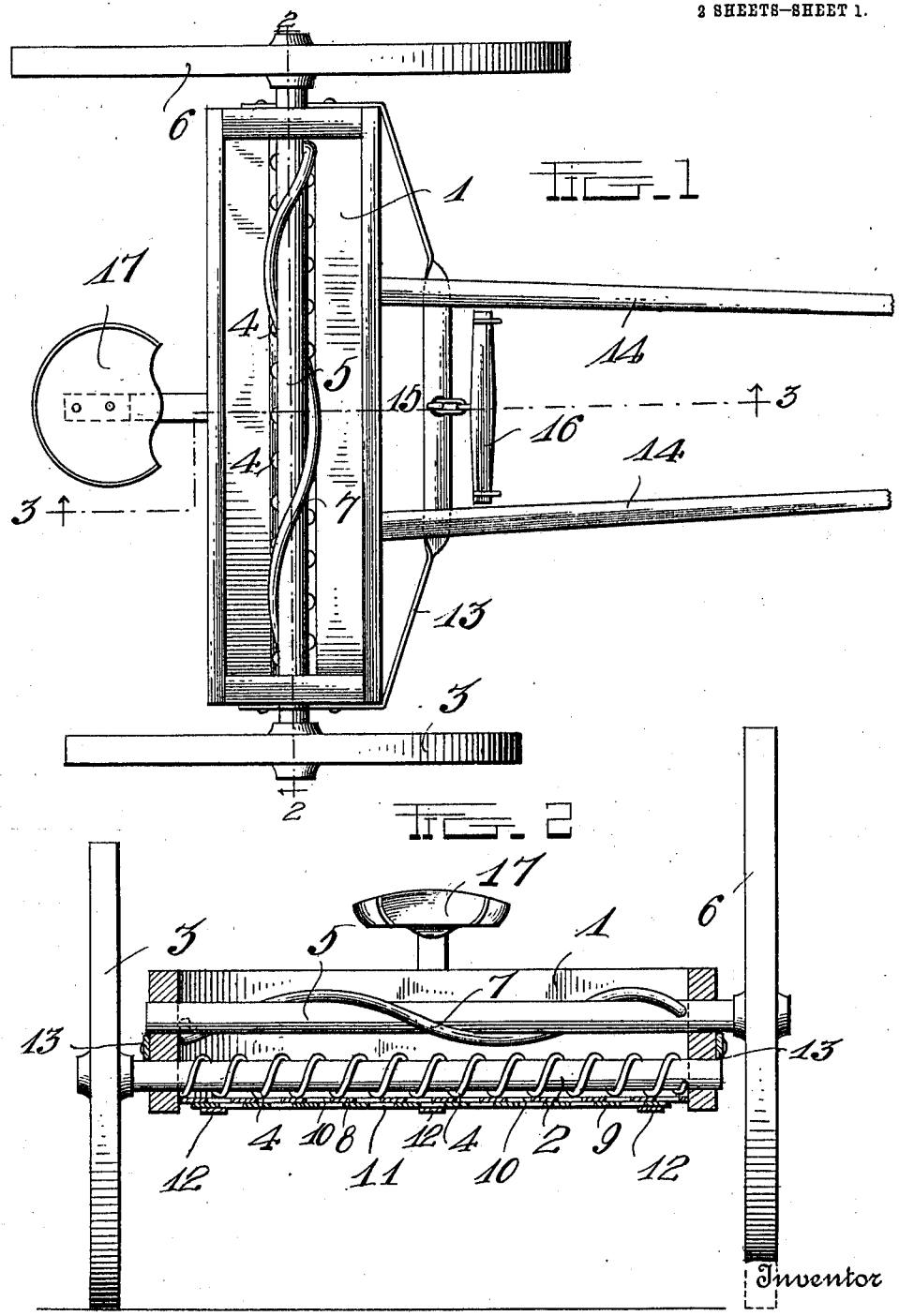

UNITED STATES PATENT OFFICE.

WALTER WILLIAM BEARDSLEY, OF SALEM, OREGON.

FERTILIZER-DISTRIBUTER.

993,815. Specification of Letters Patent. Patented May 30, 1911.

Application filed January 23, 1911. Serial No. 604,168.

*To all whom it may concern:*

Be it known that I, WALTER WILLIAM BEARDSLEY, a citizen of the United States, residing at Salem, in the county of Marion and State of Oregon, have invented certain new and useful Improvements in Fertilizer-Distributers; and I do declare the following to be a full, clear, and exact description of the invention, such as will enable others skilled in the art to which it appertains to make and use the same.

This invention relates to improvements in fertilizer distributers.

One object of the invention is to provide a fertilizer distributer having an improved construction and arrangement of agitating and feeding mechanism operated by the supporting wheels of the machine whereby the fertilizer will be readily fed from the hopper.

Another object is to provide a machine of this character which will be simple, strong and durable in construction, efficient in operation and provided with means for regulating the feed of the fertilizer.

With these and other objects in view the invention consists of certain novel features of construction, combination and arrangement of parts as will be more fully described and particularly pointed out in the appended claims.

In the accompanying drawings: Figure 1 is a plan view of a fertilizer distributer constructed in accordance with the invention; Fig. 2 is a central vertical cross sectional view through the machine on the line 2—2 of Fig. 1; Fig. 3 is a central vertical longitudinal sectional view of the same on the line 3—3 of Fig. 1; Fig. 4 is a bottom plan view of the hopper showing the arrangement of the feed regulating plates; Fig. 5 is a plan view of the agitating shaft; Fig. 6 is a similar view of the feeding shaft; Fig. 7 is a plan view of one of the adjustable feed plates of the hopper.

Referring more particularly to the drawings, 1 denotes the fertilizer hopper, said hopper being in the form of an oblong box having its sides inclined from the upper toward the lower end thereof as shown. Revolubly mounted in the opposite ends of the hopper adjacent to the bottom thereof and projecting beyond one end of the hopper is a combined supporting and feeding shaft 2 on the projecting end of which is fixedly mounted a supporting and feed shaft operating wheel 3. On the shaft 2 within the hopper is arranged a spiral feed rib 4, said rib being constructed from a wire rod which is coiled around the shaft in spiral form. The coils of the rib or wire are spaced at comparatively short distances apart as shown.

Revolubly mounted in the upper portion of the hopper above the shaft 2 is a combined supporting and agitating shaft 5 one end of which projects beyond the opposite end of the hopper from the projecting end of the feed shaft 2 and to said projecting end of the agitator shaft is fixedly mounted a combined supporting and shaft operating wheel 6. On the shaft 5 is arranged a spiral agitating rib 7, said rib being formed from a wire rod which is coiled around the shaft in long coils and is secured to the shaft at its opposite ends in any suitable manner. By thus arranging the feeding and agitating shafts and the supporting wheels it will be understood that the wheel 6 on the shaft 5 must be of larger diameter than the wheel 3 on the shaft 2. When thus arranged the wheels and shafts serve not only to support the machine but also to agitate and positively feed the fertilizer from the hopper.

The bottom of the hopper 1 is formed by two metal feed plates 8 and 9 arranged one above the other and having formed therein series of feed passages 10 and 11 which are adapted to be brought more or less into alinement with each other by shifting the plates 8 and 9 longitudinally thus regulating the size of the feed passages whereby more or less fertilizer will be fed from the hopper as desired. The plates 8 and 9 are slidably supported to form the bottom of the hopper by angular clips 12 which are secured to the front and rear sides of the hopper and have their angularly bent lower ends engaged with the under side of the lower plate 9 as shown. The clips 12 may be arranged to hold the plates in such close frictional engagement that when adjusted the plates will remain in this position until again adjusted or if desired any suitable form of adjusting and fastening mechanism (not shown) may be provided for operating and holding said plates in position.

To the opposite ends of the hopper are secured the rearwardly projecting ends of a draft bar 13, said bar projecting forwardly a suitable distance beyond the front side of the hopper and having its central portion bent parallel with said front side of the hopper as shown. To the central portion of the bar and to the front side of the hopper are secured the inner ends of the shaft or thills 14 and to said central portion of the bar between the shafts is also secured a draft hook 15 to which is adapted to be connected a swingle tree or similar draft device 16.

By arranging the parts as herein shown and described it will be readily seen that when the machine is drawn along that the supporting wheels will operate the agitating and feeding mechanism in the hopper thus distributing the fertilizer from the latter in the proper quantities as the more rapidly the machine moves the more rapidly the fertilizer will be discharged from the hopper and when the machine is moving slowly the feed of the fertilizer will be correspondingly reduced so that the fertilizer will be evenly distributed over the ground.

The machine may be provided with a driver's seat 17 arranged thereon in any suitable manner.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention what I claim is:

1. In a fertilizer distributer, a hopper, a combined feeding and supporting shaft and a combined agitator and supporting shaft revolubly mounted in said hopper, feeding and agitating devices arranged on said shafts, supporting wheels fixedly mounted on the outer ends thereof, an adjustable discharge bottom arranged on said hopper and a draft mechanism connected to the latter.

2. In a fertilizer distributer, a hopper, a combined feeding and supporting shaft revolubly mounted in the bottom of said hopper, said shaft having thereon a closely coiled spiral rib, a combined agitating and supporting shaft revolubly mounted in the upper portion of the hopper above said feed shaft, a widely coiled spiral rib arranged on said agitator shaft, said shafts having one end projecting from the opposite ends of said hopper, combined supporting and operating wheels fixedly mounted on the projecting ends of said shafts and an adjustable discharge bottom arranged on the hopper.

3. In a fertilizer distributer, a hopper, a combined feed and supporting shaft revolubly mounted in the bottom of said hopper, said shaft having thereon a closely coiled spiral rib, a combined agitating and supporting shaft revolubly mounted in the upper portion of the hopper above said feed shaft, a widely coiled spiral rib arranged on said agitator shaft, said shafts having one end projecting from the opposite ends of said hopper, combined supporting and operating wheels fixedly mounted on the projecting ends of said shafts, a bottom arranged on said hopper, said bottom comprising apertured discharge plates arranged one above the other and adapted to be shifted to vary the size of the apertures therein, and means to hold said apertured plates in operative engagement with the bottom of the hopper.

4. In a fertilizer distributer a hopper, a combined feed and supporting shaft revolubly mounted in the bottom of said hopper, said shaft having thereon a closely coiled spiral rib, a combined agitating and supporting shaft revolubly mounted in the upper portion of the hopper above said feed shaft, a widely coiled spiral rib arranged on said agitator shaft, said shafts having one end projecting from the opposite ends of said hopper, combined supporting and operating wheels fixedly mounted on the projecting ends of said shafts, a bottom arranged in said hopper, said bottom comprising adjustably supported apertured plates, a draft bar secured to the opposite ends of said hopper and projecting beyond the front side thereof, thills secured to said bar and a draft hook secured to the bar between said thills.

In testimony whereof I have hereunto set my hand in presence of two subscribing witnesses.

WALTER WILLIAM BEARDSLEY.

Witnesses:
MARK SHEPHERD SKIFF,
RAYMOND LEE FARMER.

---

Copies of this patent may be obtained for five cents each, by addressing the "Commissioner of Patents, Washington, D. C."